April 3, 1951

A. MAMOR 2,547,034

PULSE TRANSMITTING DEVICE

Filed July 1, 1948

3 Sheets-Sheet 1

Inventor
ARMAND MAMOR
By [signature]
Attorney

April 3, 1951 A. MAMOR 2,547,034

PULSE TRANSMITTING DEVICE

Filed July 1, 1948 3 Sheets-Sheet 2

Inventor
ARMAND MAMOR
By R. F. Morris
Attorney

April 3, 1951 A. MAMOR 2,547,034

PULSE TRANSMITTING DEVICE

Filed July 1, 1948 3 Sheets-Sheet 3

Inventor
ARMAND MAMOR
By R.F. Morris
Attorney

Patented Apr. 3, 1951

2,547,034

UNITED STATES PATENT OFFICE 2,547,034

PULSE-TRANSMITTING DEVICE

Armand Mamor, Antwerp, Belgium, assignor to International Standard Electric Corporation, New York, N. Y., a corporation of Delaware Application July 1, 1948, Serial No. 36,392
In the Netherlands August 28, 1947

8 Claims. (Cl. 177—380)

This invention relates to a signalling system. More particularly it deals with a system for transmitting and receiving a predetermined number of undulations of an alternating current wave which number may be varied according to the signal to be transmitted. For example, the alternating current wave may be within the voice frequency range and the number of its undulations which are transmitted may correspond to the dialling pulses for fast dialling over long distances.

Previously, the transmission of telephone dialling pulses over long distances was made by the transmission of direct current pulses or by their modulation on an alternating current carrier wave. These systems had the disadvantage that the transmission of the dialling pulses was not much faster, if at all, than the time it took to manually operate the telephone dial for sending them.

It is an object of the present invention to materially increase the speed of sending dialling pulses by counting the undulations or number of half wave lengths of an alternating current wave within the voice frequency range wherein said number of undulations corresponds to the number of dialling pulses to be sent for each digit. For example, if eight pulses are to be sent, four positive and four negative undulations are counted and transmitted over the line with a slight pause before the next digit number of undulations is transmitted.

Another object of the present invention is to transmit and receive freely numbers of pulses without the employment of mechanically moving apparatus to produce the pulses other than, for example, a push button, for the selection of desired number of pulses to be sent.

Another object is to transmit dialling pulses for long distances over telephone lines without the employment of special and separate relaying means at repeater stations, since the dialling pulses are within the voice frequency range.

Another object is to produce a special electronic circuit for switching on and off the positive and negative half periods or wave lengths of a voice frequency wave within a given narrow time interval or phase angle of the half-wave form.

In accordance with this invention, a system for transmitting and receiving a predetermined number of half waves of alternating electric energy is provided. The transmitting station comprises a source of alternating electric energy which may be switched off and on to a transmitter or a line by an electronic switching circuit controlled to switch within such a narrow phase angle of each half wave period, so that at least a sufficient amount of the period will be transmitted to produce a full signal indication. The number of half waves to be transmitted is controlled by a preset means, such as push-buttons, which control the starting of the electronic switch and by means of a counting chain which controls the electronic switch to stop transmission when the preselected number of half waves have passed through said switch. The receiving station also comprises a similar counting chain which may control a group of relays corresponding to each half wave or undulation received from the transmitting station. The frequency of the alternating energy or speed at which these half waves or pulses may be transmitted is limited only by the speed of operation of the counting chain and of the relays which restore the transmitting circuit for the transmission of the next train of undulations. Practically speaking, for alternating electric waves within the voice frequency range a group of ten undulations may be sent in about $^1/_{90}$ of a second.

The above mentioned and other features and objects of this invention and the manner of attaining them will become more apparent and the invention itself will be best understood, by reference to the following description of an embodiment of the invention taken in conjunction with the accompanying drawings, wherein.

Figure 1:
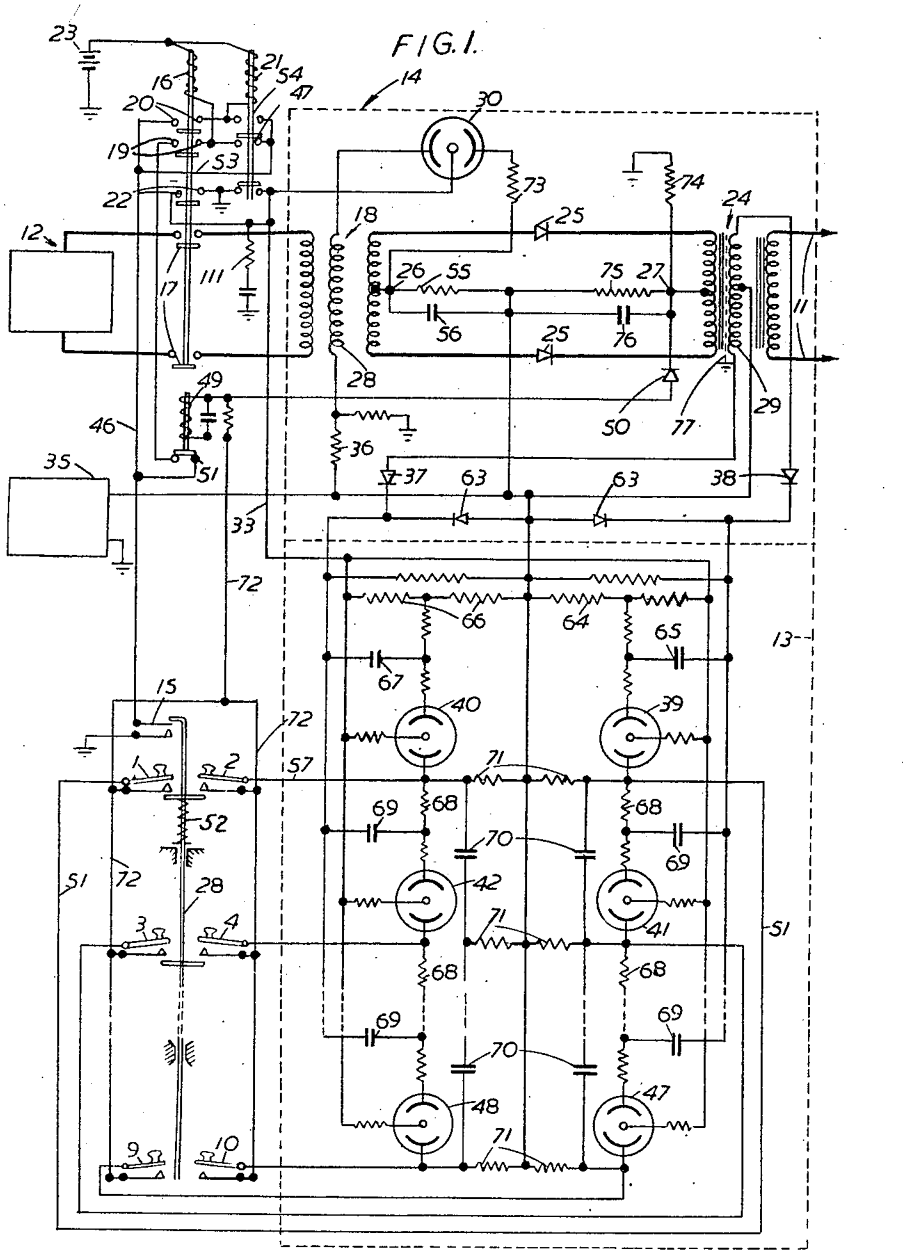
Fig. 1 is a schematic wiring diagram of a transmitter circuit of one embodiment of this invention adapted to a key-set telephone dialling system.

Referring to Fig. 1, the transmitting station circuit may comprise a series of push-buttons 1 through 10 for transmitting ten different signals, namely from one to ten successive half waves of an alternating current wave over the voice frequency telephone lines 11 from the constant alternating electric energy (A. C.) source 12. These push buttons are directly connected to an electronic counting chain circuit 13 which controls an electronically controlled static switching circuit 14 between the lines 11 and the A. C. source 12. Thus, when any one of the push buttons (1 to 10) is operated, contacts 15 are closed which energize the starting relay 16 connecting A. C. source 12 through contacts 17 to the primary of input transformer 18. Simultaneously, with the closure of contacts 17 the following other contacts are closed: self-holding contacts 19, contacts 20 for energizing the restoring relay 21, and contacts 22 to maintain the ground connection to the counting chain circuit 13 and switching circuit 14. A battery 23 or other low tension source may be provided for the operation of these two relays.

The transformer 18 together with transformer 24 and the circuit between their respective secondary and primary windings including rectifiers 25 form a "static switch" in which the relative voltage between points 26 and 27, on each side of the rectifiers at the mid-points of said secondary and primary, control the conductivity and non-conductivity of the circuit between said transformers. Each transformer 18 and 24 is provided with a tertiary winding 28 and 29 which are respectively connected to circuits which control the relative voltages at points 26 and 27 to open and close the "static switch." The secondary of transformer 24 is connected to the line 11.

Figure 3:
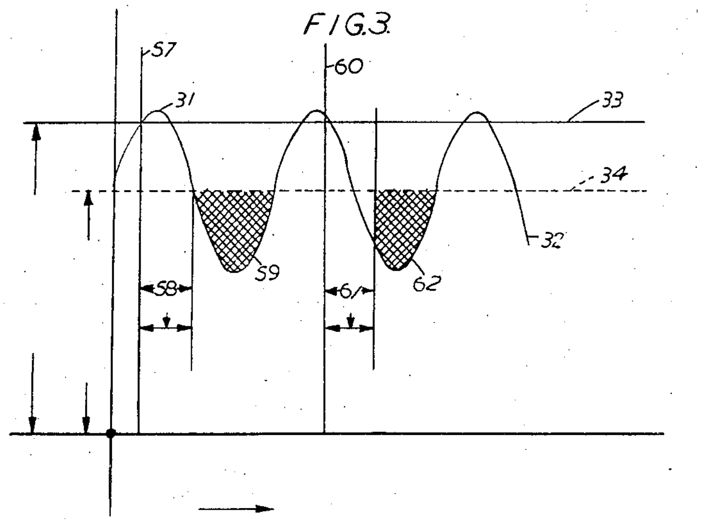
Fig. 3 is a graph of a wave form useful in explaining the operation of the circuit shown in Fig. 1.

The tertiary winding 28 of input transformer 18 is connected to a control valve, such as cold cathode tube 30, in the switching circuit 14. The tube 30 fires when the positive crest 31 (see Fig. 3) of A. C. wave 32 from source 12, rises above the breakdown voltage level of tube 30 (represented by line 33) when said A. C. potential of source 12 is superimposed on the constant D. C. bias or polarization voltage (represented by dotted line 34) from the high tension (H. T.) source 35 through potentiometer 36. The firing of tube 30, thus raises the voltage of point 26 sufficiently above that of point 27 to permit both the positive and negative A. C. pulses from source 12 to pass the rectifiers 25 to the output transformer 24 and on to the line 11.

In order to stop the transmission of the wave at the desired point, each undulation of the wave passing through the rectifiers 25 is taken from the tertiary winding 29 of transformer 24 through rectifiers 37 and 38 to operate in succession each one of the valves, such as cold cathode tubes 39 through 48, in the counting chain circuit 13. Through the push button (of the group 1 to 10) which was operated to start the circuit, the firing voltage from its corresponding tube in the counting chain 13, is directly connected through low resistance sensitive relay 49 and rectifier 50 to the point 27 to raise its voltage now above that of point 26, preventing further conduction of energy through rectifiers 25, and accordingly preventing further transmission of any undulations of the wave from the source 12 on to the line 11. This sensitive low resistance relay 49 opens its contacts 51 breaking the holding circuit for the starting relay 16 to de-energize this relay before the restoring relay 21 is released. If desired, a sensitive helping relay (not shown) may be employed for the operation of relay 49 and opening of contacts 51 in Fig. 1. The restoring relay 21, however is not released until all the cold cathode tubes have had time to deionize and the pressure of the finger on the selected push button of the group 1 to 10, has been removed and the contacts 15 have been opened due to action of spring 52 to break the circuit from ground through contacts 15, lines 46 and 53, self-holding contacts 54 of relay 21, and relay 21 to the low tension source 23. If desired, however, the operation of the contacts 15 may be controlled electrically by a slow release relay or other means well known to those in the art (not shown).

After these operations the circuit is again restored by dropping both the voltages at points 26 and 27 to their initial values in which the voltage at 27 is slightly higher than at 26, and the circuit 14 is again non-conductive to be re-initiated upon the operation of another push button of the group 1 to 10. The total operation of this circuit is sufficiently fast so that an operator in pressing one of the push buttons with the finger, as fast as manually possible, still retains the push button contact closed for a sufficient time for all of the above operations to take place.

Figure 2:
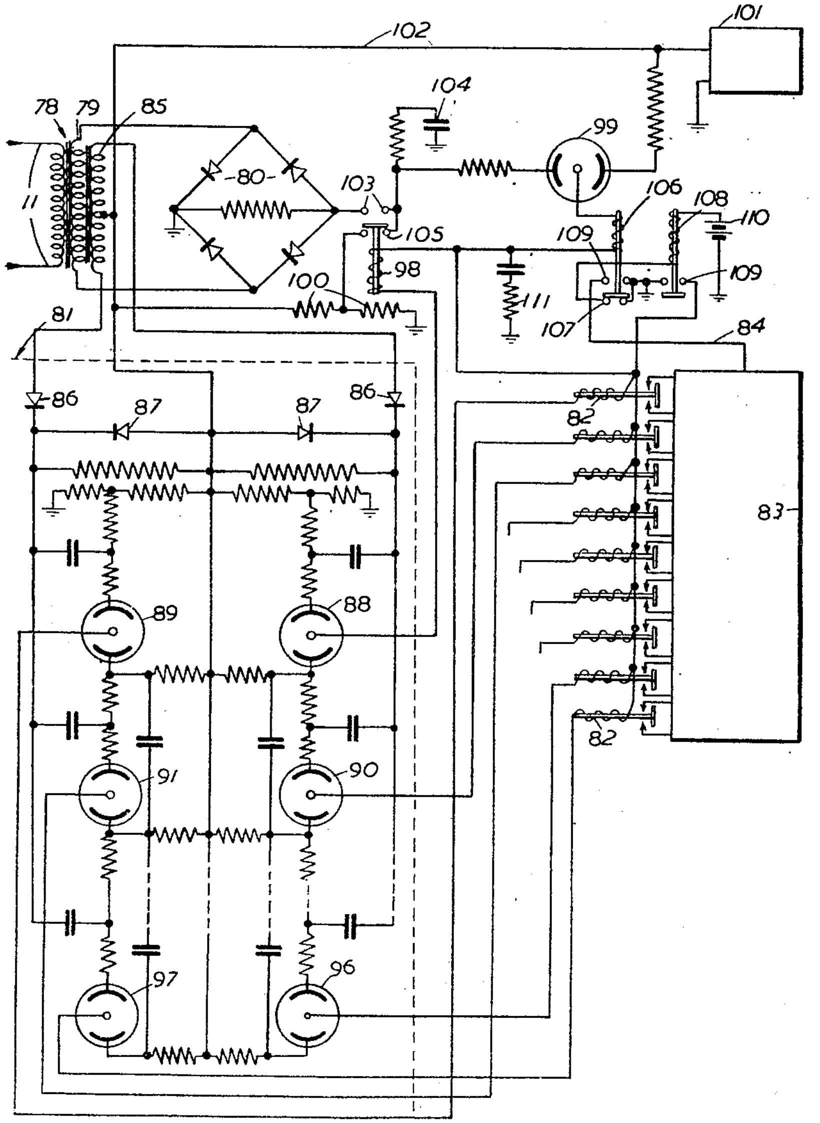
Fig. 2 is a schematic wiring diagram of one embodiment of a receiving circuit for receiving the signals sent by a circuit similar to Fig. 1.

In order to ensure that a substantial portion of the first pulse to be transmitted will be of sufficient duration and magnitude to operate the first tube 39 of the counting chain circuit 13, a delay comprising resistor 55 and condenser 56 are connected in parallel between the high tension source and the point 26. This delay is of such duration that if the contacts 17 were closed at the time indicated by the vertical straight line 57 in Fig. 3, the first undulation of the wave 32 would not be transmitted to the counting chain, because of the duration of the delay indicated by distance 58. Thus, the first pulse to pass to the counting chain, is the next and negative pulse or undulation 59 shown in Fig. 3. The amount of the delay 58, the level of the D. C. polarization voltage 34 and peak of the positive undulations of wave 32 are so chosen that if the contacts 17 are closed at a point indicated by line 60, just at the last instant to fire the tube 30, then after the delay 61 (same as 58) there will still pass a sufficient amount of the following negative undulation 62 to ensure the firing of the first tube of the counting chain circuit, both at the sending station and at the receiving station (Fig. 2).

This next and negative pulse (59 or 62) then passes its corresponding rectifier 25 through the transformer 24 on to the line 11 as well as from the tertiary winding 29 through the rectifier 38 to fire the first tube 39 of the counting chain 13 (rectifiers 63 may be inserted to suppress unwarranted polarity pulses on the counting chain circuit 13). This tube 39 is the first and only tube to be fired by this pulse or half wave in that it has applied to its control anode a polarizing voltage from the potentiometer comprising resistors 64 to charge condenser 65. Similarly for the pulses of the opposite polarity, there is provided a potentiometer comprising resistors 66 charging condenser 67 to polarize the second tube 40. The cathodes of each of these tubes are directly connected to the contacts of push buttons 1—10.

The firing of each tube passes on a polarization voltage to the control anode of the following tube through resistors 68 charging the corresponding following condenser 69 and so on, through the counting chain from one side to the other until the tube that is fired has its cathode connected through a closed corresponding push button contact 1 to 10. There are provided condensers 70 after the first two tubes 39 and 40 of each polarity, in parallel with and between the cathodes of the following tubes to prevent the firing of the following tube by the voltage surge from the cathode of the previous tube, which might bring the control anode to the breakdown potential before the next pulse reaches it. Therefore, both cathodes rise together in voltage as the previous tube fires so that the following tube will not also fire because its cathode was at a relatively lower voltage. Furthermore, each of the cathodes of each tube of the counting chain circuit 13 are connected through resistors 71 which limit the current and act as rheostats to keep the cathodes connected at a potential which is a safe distance below the break-down voltage of the tubes. The firing of the selected tube then directly applies the firing potential of that tube through conductor 72, relay 49 and rectifier 50 to the point 27 raising its potential to a level above that of point 26, and simultaneously blocking the passage of further pulses through the rectifiers 25. The rectifier 50 separates the point 27 from the cathode of the selected or marked tube of the counting chain circuit 13, so that the voltage at point 27 will not raise the cathode voltage of the marked tube, and thereby make it less sensitive to the action of the last pulse.

Both points 26 and 27 are maintained slightly below the maximum potential which may be applied to them, by means of resistors 73 and 74 respectively, the resistor 73 being greater than 74 so that in rest condition the potential at point 27 will be above that of point 26 and the static switch will be non-conductive. In order to ensure that the last pulse is completely transmitted, a delay comprising resistor 75 and condenser 76 (similar to the delay of resistor 55 and condenser 56) are connected in parallel between the high tension source and the point 27 to permit the transmission of substantially all of the pulse since the last tube is fired by the leading edge of the last pulse.

The output transformer 24 is preferably shielded as shown at 77 to prevent the starting or stopping impulse, from connecting and disconnecting the high tension D. C. source 12 to the circuit, from giving a pulse to the circuit 13 and on the line 11, which D. C. impulse may cause an erroneous signal to be received at the receiving station. Accordingly the shield 77 electrically separates the primary winding of transformer 24 from its secondary and tertiary windings.

Referring now to Fig. 2 the receiving station of the circuit, the line 11 is connected to a transformer 78 provided with a tertiary winding 79 to which is connected rectifier bridge circuit 80. If desired, an amplifier (not shown) may be inserted in the line 11 prior to the transformer 78. This receiving circuit comprises a counting chain circuit 81, similar to the counting chain of circuit 13 but having the anodes of each tube connected through separate conductors to the recording relays 82 which operate switches connected to an indicating circuit 83 that is operated through line 84 when the desired signal has been received and properly stored.

Each one of the undulations received over line 11 are transmitted to the counting chain from the secondary winding 85 of transformer 78 through rectifiers 86 and 87 (similar to 37, 38 and 63 in Fig. 1). These pulses, similarly, fire the tubes 88 through 97 in sequence.

As soon as the first tube 88 is fired, it operates the relay 98 which changes the bias on the cold cathode tube 99 from its normal fixed bias condition through potentiometer comprising resistors 100 connected to the high tension source 101 through line 102, to the "receiving" bias condition which has substantially the same potential and is provided by the received pulses or signal through the rectifier bridge 80 and now closed contacts 103. In parallel with the tube 99 is provided a time constant circuit comprising condenser 104 which holds the bias for tube 99 a sufficient time to prevent it from firing between the time that contacts 105 are opened and contacts 103 are closed during the operation of relay 98 and between successive D. C. pulses from the rectifier bridge 80. After the series of pulses corresponding to one digit signal are received, the "receiving" bias is accordingly removed, after a delay sufficient to discharge condenser 104, since no more energy is applied to the bridge circuit 80 and the tube 99 fires, operating relay 106. The operation of this relay 106 breaks the normally closed contacts 107 which breaks the circuit which maintains relay 108 normally operated. The de-energization of this slow releasing relay 108, opens its contacts 109 which opens the circuit for the de-energization of relays 82, 98 and 106 a sufficient time after ground is applied to the conductor 84 through closure of contacts 109 of relay 106 so that the indicating circuit 83 may transfer the signal set up by relays 82 to the desired indicating means before the next signal is received. All of these relays may be operated from a battery 110 or separate D. C. source (similar to source 23 in Fig. 1).

In the stopping and starting control circuits of Figs. 1 and 2 there are shown spark arresters 111, each comprising a condenser and a resistor in series.

Referring to the circuit 14 in Fig. 1, if the rectifiers 25 are not substantially equal in resistance a small compensating resistance (not shown) may be placed in series with the rectifier having the lower resistance. Furthermore, the difference in these rectifiers 25 may be reduced by making the self inductance of the primary winding of transformer 24 as large as possible. The rectification effect of the electronic switch circuit 14 may be reduced by increasing the rest value of the direct current, by decreasing the crest of the alternating current source wave, by providing a small input voltage and a high load resistance, and/or by decreasing the resistance of the outward circuit connected to the points 26 and 27. Also, two halves of the magnetic coil in the primary winding of transformer 24 through which the direct current flows, may be wound over the same portion of the magnetic core to equalize and prevent such D. C. pulses from being transmitted through the transformer. The values of the resistors employed in the circuit 14 should be properly chosen so that the maximum difference in potential between points 26 and 27 will occur each time the conductivity of the circuit is changed.

Although the above system has been described employing cold cathode tubes in the counting chains and control circuits of both the receiving and transmitting station circuits, other types of vacuum tubes, glow or arc tubes, including gas filled and grid-glow tubes may be employed.

While I have described above the principles of this invention in connection with specific apparatus, it is to be clearly understood that this description is made only by way of example and not as a limitation to the scope of this invention.

I claim:

1. A system for transmitting a predetermined number of half waves of alternating electric energy comprising a source of said energy, means to transmit said alternating energy, normally open static switching means having input and output transformers connected through rectifiers, said switching means controlling the connection between said alternating energy source and said transmitting means, a counting chain, a plurality of controllable switches, each switch corresponding to a different predetermined number of half waves desired to be transmitted, common means actuated by said switches to raise the voltage at said input transformer to close said switching means and to start transmission of said alternating energy, means responsive to the closure of said switch to actuate said counting chain, and means controlled by said counting chain and the operated one of said plurality of switches to raise the voltage at said output transformer above that of said input transformer for opening said switching means to stop said transmission and the operation of said counting chain when said predetermined number of half waves has been transmitted.

2. The system of claim 1 wherein said static switching means includes an electron discharge tube biased to fire when the peak voltage of an alternating energy half wave of a given polarity is added to the biasing voltage and also includes a delay circuit to prevent the opening of said static switching means until the following half wave of opposite polarity commences.

3. A system for transmitting a predetermined number of half waves of alternating electric energy comprising a source of said energy, means to transmit said alternating energy, normally open static switching means having input and output transformers connected through rectifiers, said switching means controlling the connection between said alternating energy source and said transmitting means, a counting chain, a plurality of controllable switches each switch corresponding to a different predetermined number of half waves desired to be transmitted, common means actuated by said switches to raise the voltage of said input transformer to close said switching means to start transmission of said alternating energy, means responsive to the closure of said switch to actuate said counting chain, means controlled by said counting chain and the operated one of said switches to raise the voltage at said output transformer above that at said input transformer for opening said switching means to stop transmission and the operation of said counting chain when said predetermined number of half waves has been transmitted.

4. A normally opened static switch in an alternating electric energy circuit which opens and closes only during the interval between successive substantially whole half-wave undulations of said energy, comprising input and output transformers each having at least a primary and secondary winding, circuit means to connect the secondary of said input transformer in series with the primary of said output transformer, first means responsive to a half wave of a given polarity of said alternating energy to apply a potential to the mid-point of said input secondary, second means responsive to half wave of a given polarity of said alternating energy to apply a potential to the mid-point of said output primary, impedance means in said circuit means blocking the flow of energy from said output mid-point to said input mid-point, means to maintain normally said output mid-point at a potential sufficiently above that of said input mid-point to block said alternating energy from flowing through said impedance means, means to actuate said first means to raise the potential at said input mid-point sufficiently above that normally maintained at said output mid-point to permit flow of said alternating energy through said impedance means, means to actuate said second means to raise the potential further at said output mid-point sufficiently to again block said alternating energy from flowing through said impedance means, and means to reset the voltages at said midpoints to their normal levels maintaining said output mid-point voltage sufficiently above said input mid-point voltage to prevent flow of said alternating energy.

5. The switch of claim 4 wherein said means to actuate said second means is controllably delayed in its operation after the operation of said means to actuate said first means.

6. The switch of claim 4 wherein said first means and second means respectively include tertiary windings in their corresponding transformers.

7. The switch of claim 4 wherein said impedance means is a rectifier means.

8. The switch of claim 4 including separate delay circuits connected to said mid-points to prevent the rise of voltage of said points until after the half waves which actuate their corresponding first means and second means passes.

ARMAND MAMOR.

REFERENCES CITED

The following references are of record in the file of this patent:

UNITED STATES PATENTS

| Number | Name | Date |
|---|---|---|
| 2,096,954 | Bellamy | Oct. 26, 1937 |
| 2,192,217 | Bellamy | Mar. 5, 1940 |
| 2,248,937 | Bellamy | July 15, 1941 |
| 2,373,134 | Mussonneau | Apr. 10, 1945 |
| 2,428,089 | Mumma | Sept. 30, 1947 |
| 2,438,492 | Bascom | Mar. 30, 1948 |
| 2,451,859 | Mumma | Oct. 19, 1948 |